May 21, 1935. H. G. DE BOU ET AL 2,001,839
LOG TRAILER
Filed June 22, 1934 3 Sheets-Sheet 1

INVENTORS
Herbert G. DeBou
Claude S. Thicke
BY
Albert E. Dieterich
ATTORNEY.

May 21, 1935.  H. G. DE BOU ET AL  2,001,839
LOG TRAILER
Filed June 22, 1934   3 Sheets-Sheet 2

INVENTORS
Herbert G. DeBou
Claude S. Thicke
BY Albert E. Dieterich
ATTORNEY.

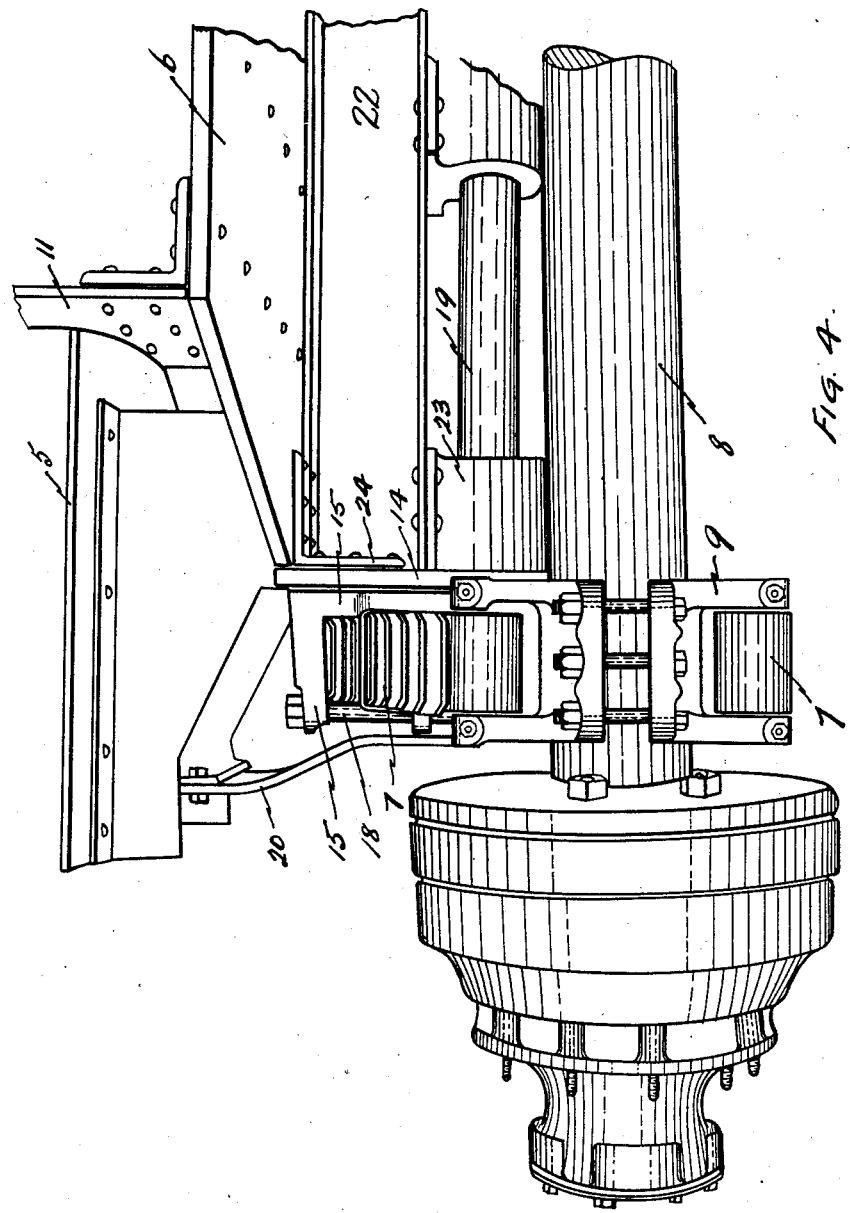

Patented May 21, 1935

2,001,839

UNITED STATES PATENT OFFICE 2,001,839

LOG TRAILER

Herbert G. De Bou and Claude S. Thicke, Vancouver, British Columbia, Canada

Application June 22, 1934, Serial No. 731,958
In Canada April 3, 1934

3 Claims. (Cl. 280—33.2)

This invention relates to a heavy duty log trailer designed specifically for use in logging operations of heavy timber.

Our invention is entirely different from the usual form of two-wheel trailer which is totally inadequate for the heavy work encountered in the logging of large timber by reason of the load imposed thereon.

To meet this requirement our invention is of massive and heavy construction throughout, and designed to stand up under the roughest usage found in all forms of logging operations, and while designed specifically for log hauling, the trailer may be used for other purposes where extra heavy duty is a requirement, by suitable modifications which do not involve structural changes.

An object of our invention has been to provide a practical log trailer suitable for use in all kinds of logging operations.

Still another object of our invention has been to provide a four-wheeled log trailer that, when secured to a logging truck, would truck behind as readily as a two-wheeled trailer without throwing undue strain upon either the wheel gear of the trailer or the hauling truck.

A still further object of our invention has been to provide a log trailer having four wheels in which the load is evenly distributed throughout over all the wheels.

Another object of our invention has been to provide a log trailer in which the main load is pivotally mounted upon spring suspension between the two main axles of the trailer, thereby providing an easy running and flexible trailer.

With these and other objects in view we have invented the four-wheeled log trailer which is the subject matter of this application and which is further illustrated in the accompanying drawings forming part of this application, and in which:

Figure 4 is a detail perspective view of the trailer looking at one corner thereof with the wheels removed.

Figure 1:
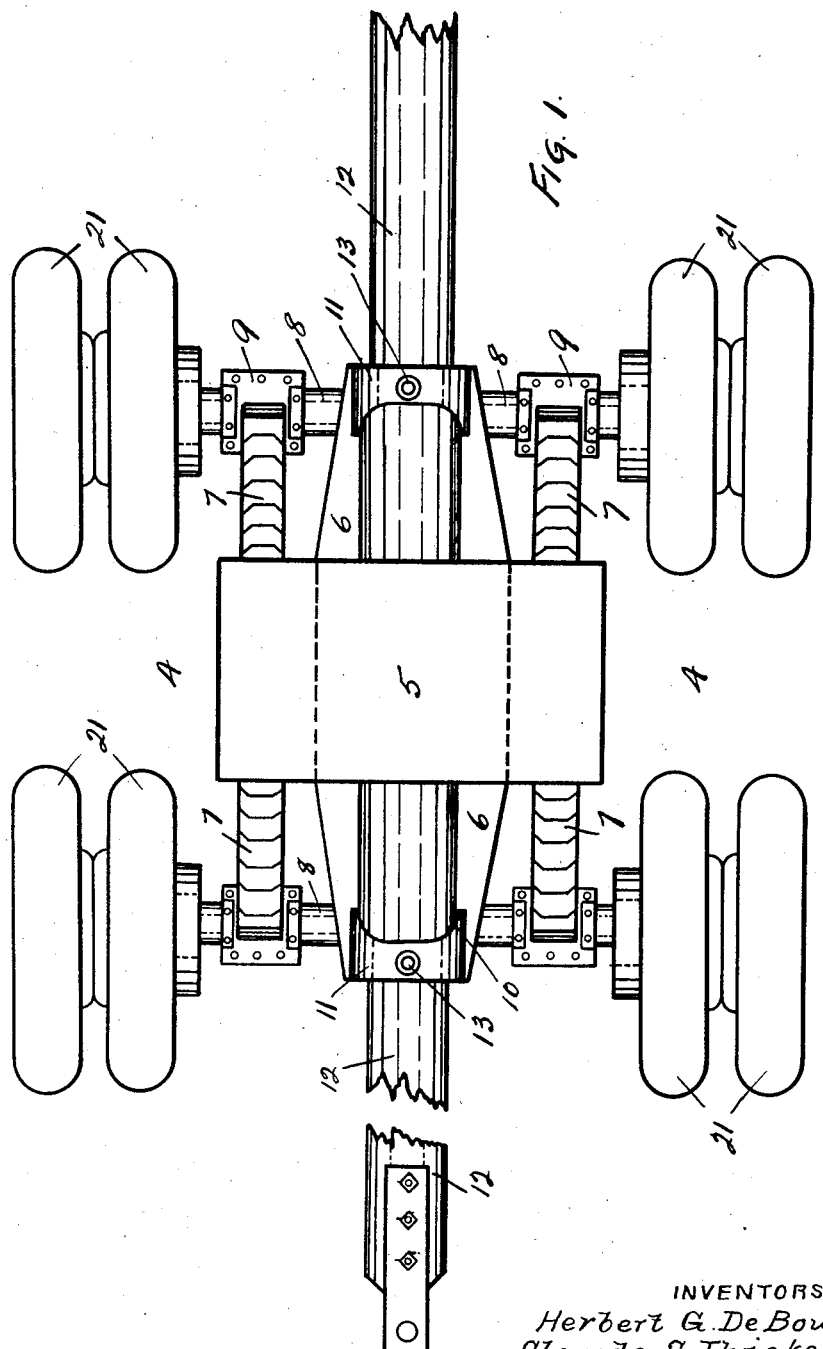
Figure 1 is a plan view of the log trailer showing the bolster carriage in the centre, the four, dual-tired wheels, spring mounting, and reach pole and clamps.

In these drawings like numerals indicate like parts, and the numeral 4 indicates a four-wheeled duel tired log trailer generally, and 5 the top of the bolster carriage mounted above the main bed-plate 6 upon the springs 7 secured to the axles 8 of the trailer through the spring shackle blocks 9.

Figure 2:
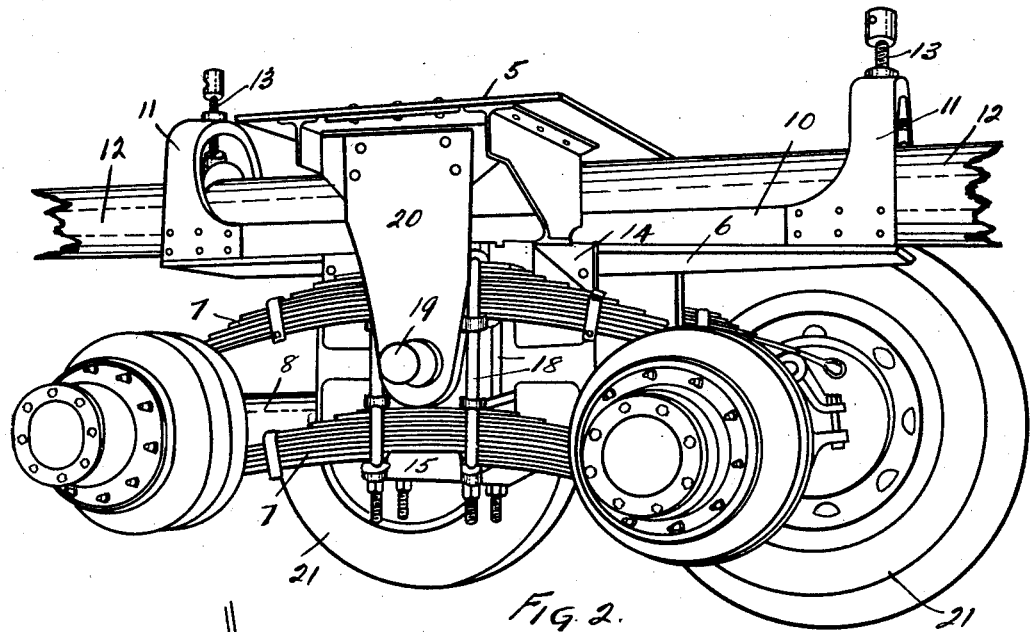
Figure 2 is a perspective side elevation with two of the side wheels removed to show the spring mounting of the wheels and bolster carriage and end of trunnion bearing to bolster carriage.

The main bed-plate 6 has riveted upon it a longitudinal channel member 10 to each end of which is riveted the reach-pole clamps 11, through which the reach-pole 12 (see Figure 2) is secured by the clamp screws 13.

The bolster carriage 5 is so arranged above the main bed-plate 6 that the reach-pole 12 passes underneath it.

The centre portion of the main bed-plate 6 has parallel sides tapering at each end to the approximate width of the reach-pole clamps 11 (see Figure 1).

The underside of the centre and parallel portion of the bed-plate 6 is reinforced by transverse channel members 22, to the underside of which are secured the bearing blocks 23, in which is located the main trunnion bearing shaft 19.

The parallel sides of the bed-plate 6 are further reinforced by heavy angle plates 24. Secured rigidly to the angle plates 24 (one on each side) are the heavy rectangular side plates 14, through the centre of which project the ends of the main trunnion bearing shaft 19 carried by the bearing blocks 23 upon the underside of the transverse channel members 22.

Mounted upon the projecting ends of the trunnion bearing shaft 19 and upon the outer faces of the rectangular side plates 14 are the spring mounted trunnion blocks 26, the flat top and bottom faces 27 of which comprise seats for the multiple leaf springs 7.

Figure 3:
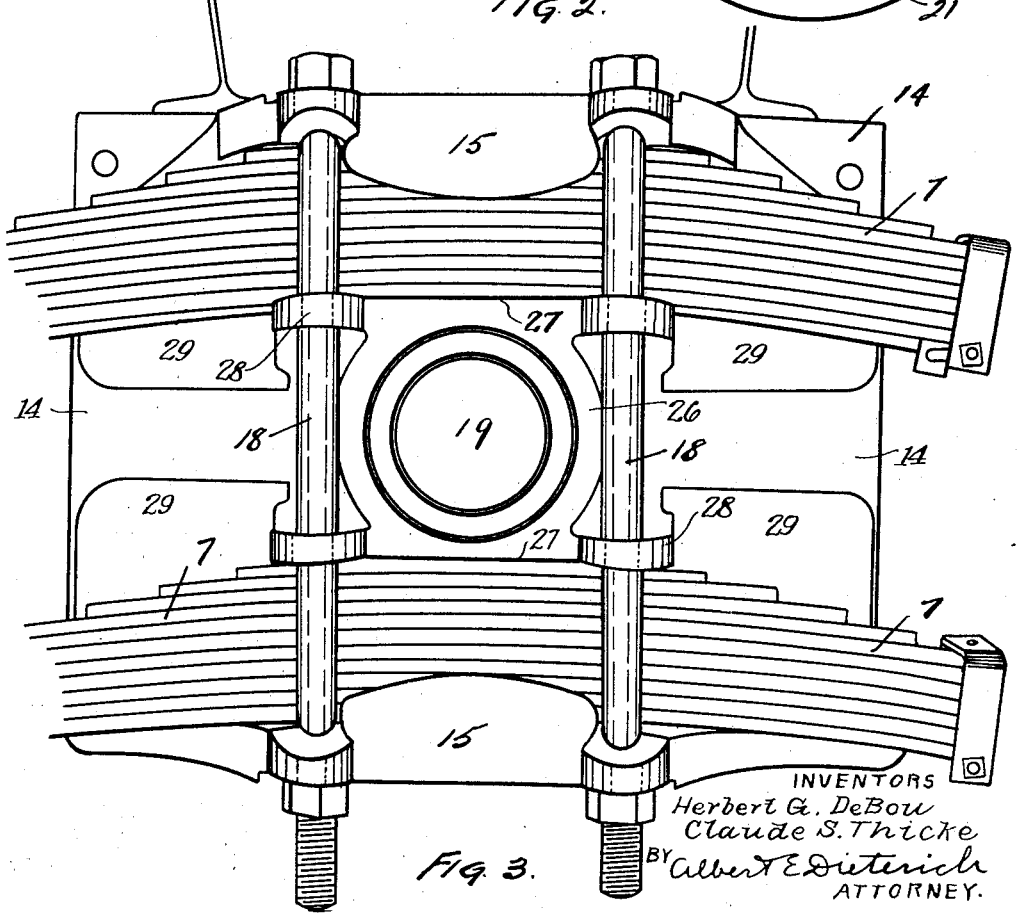
Figure 3 is a detail view of the trunnion bearing block showing the method of spring mounting of the chassis of the trailer.

The springs 7 are retained upon their seats 27 by the spring pack clamp plates 15 secured by the bolts 18 which pass through the lugs 28 formed at each corner of the trunnion blocks 26 and then through the clamp plates 15, as shown in Figure 3.

The spring pack clamp plates 15 are flanged and have the front surfaces 29 machined to comprise a smooth rubbing surface for the inside edges of the leaf springs 7 to prevent wear when the springs 7 are flexing under load.

The main body portion or backs of the flanged spring pad clamp plates 15 lie intermediate of the heavy rectangular side plates 14 and the springs 7 (see Figure 4) and the outer face of the rectangular plate 14 comprise a rubbing surface and support for the backs of the flanged clamp plates 15, and they are both free to move independently of each other, and this is a specially valuable feature when the bolster carriage 5 and main bedplate 6 are oscillating or swinging under load when passing over rough ground.

The spring pack clamp plates 15 are interchangeable and there are two plates to each side—a top and bottom one, see Figure 3.

At each end of the bolster carriage 5 are bolted the cover plates 20, which serve as a substantial support for the outer ends of the bolster carriage 5, besides providing a coverage for the upper spring mounting.

Reviewing the chassis structure proper, it will be noted that the ends of the leaf springs 7 are secured upon the axles 8 through the spring shackle blocks 9 and that, mounted between each pair of springs 7 intermediately of the axles 8, are the trunnion blocks 26 carrying the trunnion shaft 19.

Mounted pivotally between the backs of the spring pack flange plates 15 and upon the trunnion shaft 19 is the bolster carriage 5 comprising the main bed-plate 6, to the lower side of which are the bearings 23 mounted upon the transverse channel members 22, which form the main support to the bed-plate 6 and bolster carriage 5.

The heavy rectangular side plates 14 merely comprise longitudinal support and strength to the sides of the centre and parallel portion of the main bed-plate 6 and form side walls to the back of the spring pad flange plates 15 (see Figure 4).

Through the pivotal mounting of the bolster carriage 5 and main bed-plate 6 upon the trunnion shaft 19 the ends of the main bed-plate 6 which carry the reach-pole clamps 11, are free to move in an up-and-down direction independently of the movement of the axles of the wheels, and this is a particularly valuable feature when handling long timber over rough ground, as it relieves the main chassis of very severe strains.

The wheels 21 of the trailer are preferably of the dual tired type to support the enormous load imposed upon the trailer when loaded with large timber.

In the construction of the trailer as aforesaid, it is to be particularly noted that there is no rigid connection between the axles of the trailer, such as radius rods or other forms of reinforcements, to hold the axles in parallel alignment and this manner of construction is particularly advantageous in a four wheeled trailer of the kind described and for the purpose intended, as it permits of better trucking qualities behind the hauling unit, especially when loaded with long timbers as when making, say a sharp right angled turn the action is such that the springs on the inside curve of the turn are caused to bow sharply and hence draw the axles more closely together while the springs on the outer side of the curve are caused to straighten out and lengthen, hence driving the axles further apart and aiding the wheels of the trailer in meeting the radius of the curve taken without undue skidding or side stepping of the tires, hence relieving the latter of much undue wear.

Having now described our invention, what we claim and desire to be protected in by Letters Patent, is:

1. In a log trailer of the kind described, the combination comprising, a four-wheeled chassis, said chassis having a pair of trunnion blocks, each of said blocks being mounted between a pair of multiple leaf springs, said springs being mounted intermediate the axles of said chassis, flanged clamp plates positioned oppositely each other securing each of said springs to said trunnion block, bolts securing said clamp plates, springs and trunnion blocks to each other, a trunnion bearing mounted in said blocks, a bolster carriage mounted on said trunnion bearing adapted to oscillate independently of the axle of said wheels, and means for adjustably mounting a reach-pole in the chassis of said trailer.

2. In a log trailer of the kind described, the combination comprising, a four-wheeled chassis, said chassis having its axles spaced apart and secured to the ends of two pair of multiple leaf springs, each of said pair of springs being spaced apart in their centre by a trunnion block mounted therebetween, flanged clamp plates and bolts securing said springs and trunnion blocks together, a trunnion bearing mounted in said trunnion blocks, a bolster carriage and bed-plate pivotally mounted upon said trunnion bearing intermediate of said trunnion blocks and adapted to oscillate independently of the axles of said wheels and the spring mounting of said bolster carriage and bed-plate, and means for adjustably mounting a reach-pole in the chassis of said trailer.

3. In a log trailer of the kind described the combination comprising, a four-wheeled chassis, said chassis having a pair of multiple spring-mounted trunnion blocks, said blocks mounted intermediately of the axles and wheels of said chassis, a trunnion bearing mounted in said blocks, a bolster carriage mounted on said trunnion bearing adapted to oscillate independently of the axles of said wheels, and means for adjustably mounting a reach-pole in the chassis of said trailer.

HERBERT G. DE BOU.
CLAUDE S. THICKE.